United States Patent [19]
Nagel Erich et al.

[11] Patent Number: 5,126,785
[45] Date of Patent: Jun. 30, 1992

[54] METHOD OF AND APPARATUS FOR CUTTING DEVELOPED FILM

[75] Inventors: Nagel Erich, Anzing; Gerhard Benker, Pullach, both of Fed. Rep. of Germany

[73] Assignee: Agfa-Gevaert Aktiengellschaft, Leverkusen, Fed. Rep. of Germany

[21] Appl. No.: 602,116

[22] Filed: Oct. 22, 1990

[30] Foreign Application Priority Data

Oct. 27, 1989 [DE] Fed. Rep. of Germany ....... 3935915

[51] Int. Cl.$^5$ .............................................. G03B 29/00
[52] U.S. Cl. ........................................ 355/28; 355/29
[58] Field of Search .................................. 355/28, 29

[56] References Cited

U.S. PATENT DOCUMENTS

| | | | |
|---|---|---|---|
| 4,167,678 | 9/1979 | Mischo | 250/559 |
| 4,176,944 | 12/1979 | Payrhammer | 355/29 |
| 4,279,502 | 7/1981 | Thurm | 355/38 |
| 4,565,442 | 1/1986 | Benker | 355/68 |
| 4,922,289 | 5/1990 | Kogane et al. | 355/29 |
| 4,947,205 | 8/1990 | Benker | 355/41 |

Primary Examiner—Monroe H. Hayes
Attorney, Agent, or Firm—Peter K. Kontler

[57] ABSTRACT

A band of exposed and developed photographic film is transported longitudinally along a predetermined path. The film carries a series of images and each of the images has a pair of edges which are spaced longitudinally of the band and extend transversely of the latter. Transverse, strip-shaped segments of the band are photoelectrically scanned to detect abrupt density changes associated with the edges of the images. In addition, the band is sensed at a predetermined location of its path in order to ascertain the length of the band travelling by the predetermined location. The density and length data are sent to a microprocessor which uses the data to assign a position coordinate to each detected edge and its corresponding image. The position coordinates represent the positions of the images longitudinally of the band. The position coordinates are employed by the microprocessor in conjunction with other data such as the length of the band and the number of images to determine the locations at which the band is to be cut so that none of the resulting strips is to long or too short, or has to many or too few images. The microprocessor controls a marking device which marks the locations or a cutting device which severs the band at these locations.

15 Claims, 3 Drawing Sheets

METHOD OF AND APPARATUS FOR CUTTING DEVELOPED FILM

BACKGROUND OF THE INVENTION

The invention relates generally to a method of and apparatus for processing a band of exposed and developed photosensitive material.

More particularly, the invention relates to a method and apparatus in which a band of exposed and developed photosensitive material is conveyed longitudinally along a predetermined path. The band travels through a scanning station where it is scanned to determine the positions of the transverse edges of the images, i.e., the edges of the images extending along the width of the band. These positions, in turn, serve to identify the positions of the unexposed areas between neighboring images. Scanning may be carried out photoelectrically and can be accomplished, for example, via a scanning slit which extends across the path of the band. At a processing station spaced from the scanning station, an operation is performed on areas of the band having specific positional relationships relative to the images. Movement of the images is regulated by measuring the length of the band travelling by a predetermined location of its path. The length measurements can be used to assign position coordinates to the edges detected in the scanning station and such position coordinates, which represent the positions of the detected edges longitudinally of the band, are stored.

A method of marking an elongated band consisting of a plurality of individual films joined end-to-end is disclosed in the commonly-owned U.S. patent application no. 415,066 filed 29 Sep. 1989. Here, the positions of the transverse edges of the images, i.e., the positions of the unexposed areas between neighboring images, are determined for the entire band. The band is transported step-by-step and, after making adjustments for the relationships between the positions of the edges, the lengths of the respective images and the lengths of the steps, the edge of the band is provided with markings. These markings are used to properly position the images relative to a copying window or a cutting device. However, no information is obtained on how to cut the band, given the overall length of the latter and the number of images, so that none of the resulting strips are too long or too short.

In the commonly-owned U.S. patent application no. 415,065 filed 29 Sep. 1989, individual films in a copying apparatus are wound onto a take-up reel constituting part of a storage device. As a film is fed into the storage device, the film is scanned over its entire length by means of a narrow scanning slit in order to generate density values for exposure control and additional values for positioning purposes. These values are sent to a computer for storage and processing.

The entire film is subsequently removed from the storage device by reversing the direction of travel of the film and conveying the latter by the copying window of the copying apparatus. To prepare the film for delivery to the customer, the film must then be manually wound or manually cut into strips of appropriate length.

SUMMARY OF THE INVENTION

It is an object of the invention to provide a method which makes it possible to reduce manual manipulation of a band of photosensitive material.

Another object of the invention is to provide a method which enables a band of photosensitive material to be divided into strips of appropriate length automatically.

An additional object of the invention is to provide an apparatus which allows manual manipulation of a band of photosensitive material to be reduced.

A further object of the invention is to provide an apparatus which makes it possible to automatically divide a band of photosensitive material into strips of suitable length.

The preceding objects, as well as others which will become apparent as the description proceeds, are achieved by the invention.

One aspect of the invention resides in a method of processing a band of exposed and developed photosensitive material, particularly photographic film, carrying a multiplicity of images each of which has a pair of transverse edges, i.e., edges extending along the width of the band, spaced longitudinally of the latter. The method comprises the steps of conveying the band longitudinally along a predetermined path; measuring the length of the band travelling by a predetermined location of the path; establishing the positions of selected images on the band; and processing the band at a processing location of the path using results of the measuring and establishing steps. The processing step includes dividing the band, or marking the band for division, into strips having at least a predetermined minimum length or at least a predetermined minimum number of images.

It is preferred that the strips not exceed a predetermined maximum length or that the number of images on the strips not exceed a predetermined maximum value.

The band may be provided with markings which have predetermined positional relationships with reference to respective ones of the images. These markings may be in addition to any division marks which may be formed on the band during the processing step.

Division of the band is preferably carried out in such a manner that at least one, and advantageously both, of the strips containing an end of the band have at least the predetermined minimum length or at least the predetermined minimum number of images.

According to one embodiment of the invention, the band is provided with division marks during the processing step. The selected images are subsequently copied and the band then divided at the division marks.

The establishing step may involve detecting at least one transverse edge of each selected image. Such detection may be performed photoelectrically and may be carried out by successively scanning strip-shaped portions of the band extending transversely thereof.

According to another embodiment of the invention, detection of the transverse edges is undertaken at a preselected location of the path of the band disposed downstream of the processing location as considered in a first direction. During detection, the band is conveyed by the preselected location in the first direction. Subsequently, the direction of travel of the band is reversed and the band is conveyed by the preselected location and to the processing location in a second direction counter to the first direction. The band is then processed during travel in the second direction and the processing step may involve dividing the band. The processing step may further include copying the selected images prior to division. Preferably, the position of each detectable transverse edge in the band is established and the dividing step thereupon carried out based on all of the positions.

The establishing step may additionally involve assigning a position coordinate to each detected transverse edge representing the position of the respective transverse edge longitudinally of the band and such assignment may be performed using results of the measuring step. The position coordinates obtained in this manner may be stored.

Another aspect of the invention resides in an apparatus for processing a band of exposed and developed photosensitive material, particularly photographic film, carrying a multiplicity of images each of which has a pair of transverse edges spaced longitudinally of the band. The apparatus comprises means for conveying the band longitudinally along a predetermined path and means at a predetermined location of the path for measuring the length of the band travelling by the predetermined location. Means for processing the band is disposed at another location of the path and includes means for dividing the band into strips or marking the band for division into strips. The apparatus further comprises means for regulating at least one of the conveying means and the processing means so that the latter divides the band, or marks the band for division, into strips having at least a predetermined minimum length or at least a predetermined minimum number of images. The regulating means is designed to receive data from the measuring means and to establish the positions of the images longitudinally of the band.

The regulating means preferably regulates the conveying means and/or the processing means in such a manner that the lengths of the strips do not exceed a predetermined maximum length or that the number of images on any strip does not exceed a predetermined maximum value.

The regulating means may include means for detecting the transverse edges of the images and the detecting means may comprise a photoelectric sensor. The detecting means may further comprise a member having a scanning slit in register with the predetermined path and extending transversely thereof, and a source of illumination for the slit.

The regulating means may be programmed to assign a position coordinate to each detected transverse edge representing the position of the respective transverse edge longitudinally of the band. A memory may be provided for the regulating means and the latter may be designed to store the position coordinates in such memory.

In accordance with the invention, data obtained during a previous scanning procedure on the positions of the images, or the unexposed areas between neighboring images, in an entire band of photosensitive material or an entire film is used.

In accordance with the invention, the locations at which a band or film is to be divided for packaging are optimally positioned using data obtained during a previous scanning procedure on the positions of the images, or the positions of the unexposed areas between images, in the entire band or film. In other words, the invention regulates the dividing process ahead of time, without again scanning the entire band or film, such that none of the resulting strips are too long or too short, e.g., for a possible reorder.

The novel features which are considered as characteristic of the invention are set forth in particular in the appended claims. The improved processing apparatus itself, however, both as to its construction and its mode of operation, together with additional features and advantages thereof, will be best understood upon perusal of the following detailed description of certain specific embodiments when read in conjunction with the accompanying drawings.

DESCRIPTION OF THE PREFERRED EMBODIMENTS

Figure 1:
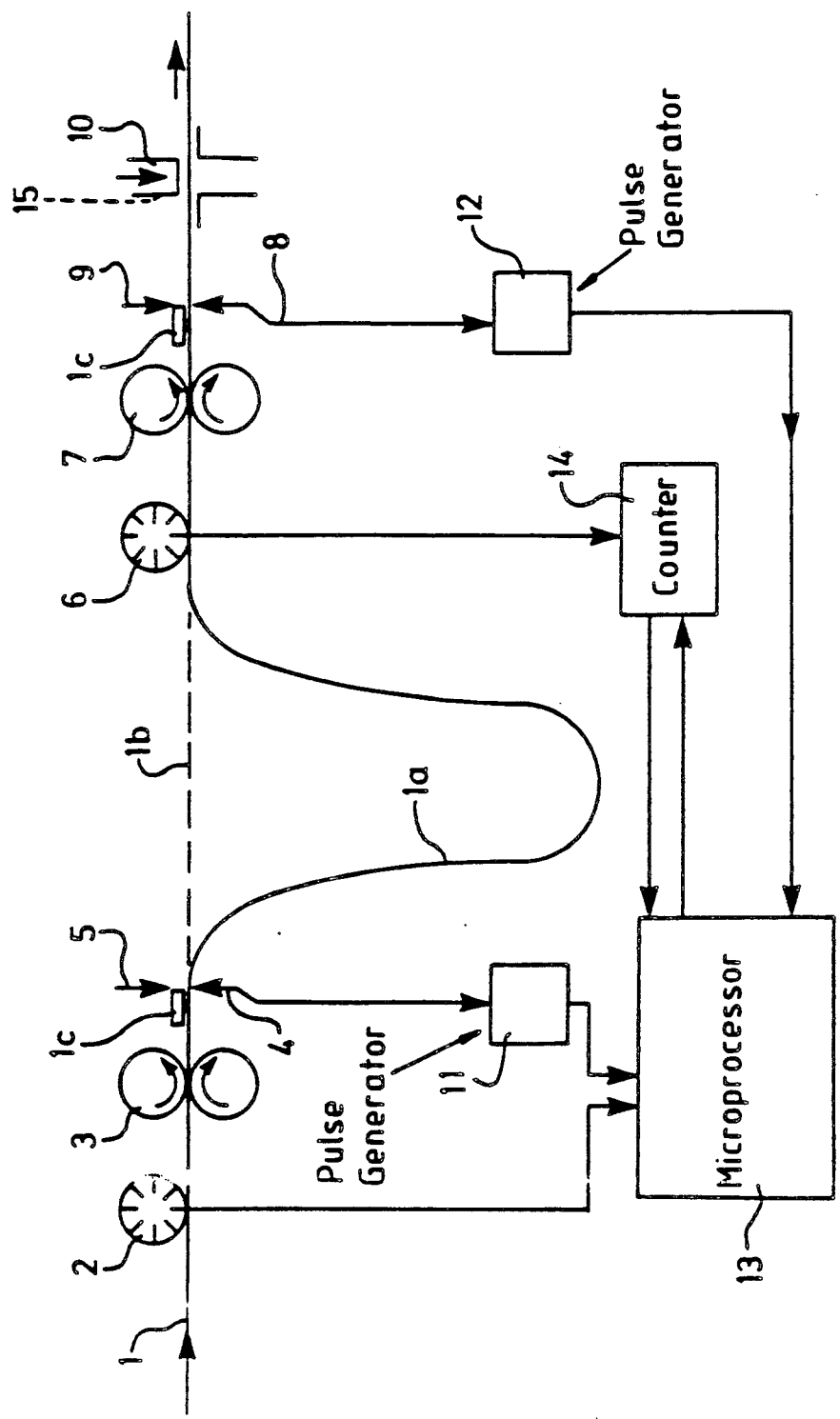
FIG. 1 is a schematic side view of an apparatus in accordance with the invention for continuously processing a band of exposed and developed photosensitive material.

Referring to FIG. 1, the reference numeral 1 identifies a long band of exposed and developed photosensitive material which is here made up of a series of individual films joined end-to-end. The band 1 carries a multiplicity of exposed and developed images or negatives which have no specific positional relationship with reference to perforations. By way of example, this is the case for Type 135 film which is provided with perforations for transport purposes but where the positions of the images are not related to the positions of the perforations. Similarly, the band 1 could include unperforated film such as Type 120 film.

The band 1 is conveyed longitudinally along a predetermined path and the apparatus of FIG. 1 includes a non-illustrated, conventional guiding arrangement for the band 1. In FIG. 1, the band 1 first travels beneath a device 2 which serves to measure the length of the band 1 passing by the location of the device 2. The length measuring device 2 can, for instance, be a roller which is connected with a perforated disc whose perforation or perforations are scanned by a light barrier. The light barrier generates a series of pulses representing a measure of the length of the band 1 which has passed by the measuring device 2, and hence of the distance travelled by the band 1. Downstream of the measuring device 2 is a set of drive rollers 3 which are connected to a motor, e.g., a step motor, and function to advance the band 1. If the motor for the drive rollers 3 is a step motor, the length measuring device 2 can be replaced by a counter which counts the control pulses delivered to the step motor.

A scanning station 4 for measuring the density of the band 1 follows the drive rollers 3 in the direction of travel of the band 1. The scanning station 4 may include a slotted member which is provided with a slit, e.g., of 0.2 mm width, in register with the path of the band 1 and extending perpendicular thereto, and a source of illumination for the slit. The scanning station 4 is preferably designed to scan the band 1 photoelectrically. When the band 1 is scanned continuously, the intensity or density signal obtained for the band 1 via the slit yields a density profile for the band 1. Marked changes, i.e., density jumps, in the density profile make it possible to readily recognize so-called image edges constituting the ends of the images. This is the case even though objects within the images such as, for instance, brightly illuminated edges of houses against a dark background, telephone poles and the like, can cause similar density jumps. The image edges detected in the scanning station 4 are the transverse edges of the images, that is, the edges extending transversely of the band 1.

Opposite the scanning station 4 is a sensor 5 for junctions 1c. The junctions 1c are produced when, in order to facilitate processing, individual films are joined end-to-end by means of hot sealing strips so as to form the long band 1. As a rule, such hot sealing strips are opaque to infrared light and can be precisely located by infrared sensors.

A second length measuring device 6, which can be identical to the length measuring device 2, is located at a certain minimum distance downstream of the scanning station 4 and the junction sensor 5. A second pair of drive rollers 7 corresponding to the drive rollers 3 and also serving to advance the band 1 follows the length measuring device 6 as considered in the direction of travel of the band 1. The drive rollers 7, in turn, are followed by a second scanning station 8 which can be identical to the scanning station 4 and a second junction sensor 9 corresponding to the junction sensor 5. Downstream of the scanning station 8 and the junction sensor 9 is a processing station which here includes a punch 10 for punching notches in the shape of a half moon into one edge of the band 1 such that the notches have predetermined positional relationships with respect to the detected images of the band 1. With the aid of the notches, the band 1 can be properly positioned in a copying window of a roll copying machine as well as in a cutting machine. The band 1 may be wound onto a reel or may travel directly into a roll copying machine after passing by the punch 10.

A second punch 15 which may be identical to the punch 10 is disposed directly across from the punch 10 on the opposite side of the path of the band 1. The punch 15, which is controlled independently of the punch 10, functions to punch cutting marks into the second edge of the band 1. The cutting marks identify the locations at which the band 1 is to be cut into strips.

The length measuring device 2, scanning station 4 and junction sensor 5 together constitute a first group of measuring and scanning devices while the length measuring device 6, scanning station 8 and junction sensor 9 together constitute a second group of measuring and scanning devices The band 1 may follow various paths between the two groups of measuring and scanning devices. One such path is a looped path shown by the solid line 1a while another such path is a straight path shown by the broken line 1b and representing the shortest path between the two groups of measuring and scanning devices.

The length measuring device 2 is directly connected to a microprocessor 13 which is also connected to and receives signals from the scanning station 4 via a pulse former or generator 11. Similarly, the scanning station 8 sends signals to the microprocessor 13 through a pulse former or generator 12. Each of the pulse generators 11,12 may, for example, contain a differentiating unit, a rectifier and a threshold switch which produce short, rectified pulses of different magnitude from density jumps having a certain minimum size. The minimum size is smaller than that required to detect a transverse edge of an image.

The length measuring device 6 is connected to a step counter 14. The state of the counter 14 can be transmitted to the microprocessor 13 by means of a suitable conductor. The counter 14 can also be reset by the microprocessor 13.

The operation of the apparatus of FIG. 1 is as follows:

The apparatus is designed to calculate the positions of the images as precisely as possible by using all of the information in an entire film or at least in a large percentage of the images of a film. This requires that the punch 10 begin to operate only after all of the information in a film, or in a portion of the film, has been fed into the microprocessor 13 by the scanning station 4, i.e., only when the junction 1c at the trailing end of the film has reached the sensor 5. Thus, it is only at this time that the junction 1c at the leading end of the film can be permitted to travel by the sensor 9 into the processing station 10,15. However, each of the various types of film comes in 10 different lengths. For instance, Type 135 film, the so-called small format film, is commercially available in cartridges having 36, 24 and 12 exposures. The straight path between the junction sensor 5 and the junction sensor 9 along the broken line 1b has a length approximately equal to that of the shortest film to be processed. On the other hand, the looped path 1a, along which the film is freely suspended in an appropriate chamber, is dimensioned so that it can accommodate the longest film to be processed. The looped portion of the film in the path 1a is supported at both edges in a conventional manner by non-illustrated deflecting rollers.

The microprocessor 13 is provided with a memory. During scanning of a film in the scanning station 4, all marked density jumps, i.e., all abrupt density changes having a minimum magnitude established by a threshold switch, are fed into the memory of the microprocessor 13 together with the associated length or distance measurement from the length measuring device 2. By means of a program such as disclosed, for example, in the West German Patent No. 27 05 097, the microprocessor 13 calculates and stores the longitudinal coordinates of the images in the film, that is, the positions of the images longitudinally of the film. The distance travelled by the film after the junction 1c at the leading end of the film leaves the junction sensor 9 can be determined from the count of the length measuring device 6 and, based on this distance, the location of each individual image can be established. However, due to slip, deformation and/or wear of the measuring roller, errors arise in the measurements of the length measuring device 6 as the distance between the latter and the junction 1c at the leading end of the film increases. To compensate for such errors, the marked density changes are detected once again in the second scanning station 8 and transformed into pulses. The longitudinal coordinates for these density changes derived from the initial scan in the scanning station 4 are then compared with the count of the counter 14. Each of the density jumps recorded in the memory makes it possible to perform this kind of a check. If there is a difference between the count of the counter 14 and the stored longitudinal coordinate of the respective density jump obtained from the length measuring device 2 during the initial scan, the count of the counter 14 is corrected so that it corresponds to the stored longitudinal coordinate. In this manner, the count of the counter 14 is continuously checked and corrected if necessary. Checking and correction are, as a rule, performed at each transverse image edge and also at marked density jumps occurring between edges.

If the constant comparisons and the corrections to the counter 14 indicate that the differences between the two length measuring devices 2 and 6 are proportional to the distance travelled, the error in length can be reduced by linear extrapolation in the microprocessor 13 beyond the last marked density jump before the desired end point.

It is obvious that the length measurements of the device 2 are also in error. However, this has no effect on positioning as long as the length measurements of the two devices 2 and 6 are kept in correspondence through continuous monitoring.

The outlined procedure in which the loading junction 1c of a film is held at the sensor 9 until the trailing junction 1c of the same film passes by the sensor 5 has been simplified for better understanding. In practice, the memory of the microprocessor 13 must be sufficiently large to store the longitudinal coordinates for the image edges and density jumps of several films if the desired procedure is to proceed without interruption. Matching of data output with the respective film can then be accomplished via the junctions 1c entering the path between the two groups of measuring and scanning devices 2,4,5 and 6,8,9 in a manner similar to that disclosed in the European Patent No. 0 141 391.

Based on predetermined reference values, namely, the maximum permissible length of a strip and either the minimum permissible number of images per strip or the minimum permissible length of a strip, the microprocessor 13 calculates where, or between which images, a cutting mark is to be applied. The programming required to generate control signals for the punch 15 constitutes routine technique for the person of ordinary skill with a conventional microprocessor. No control signals are required for film transport since, for application of the notches indicating the locations of the images, the film stops in the proper position without such signals.

Figure 2:
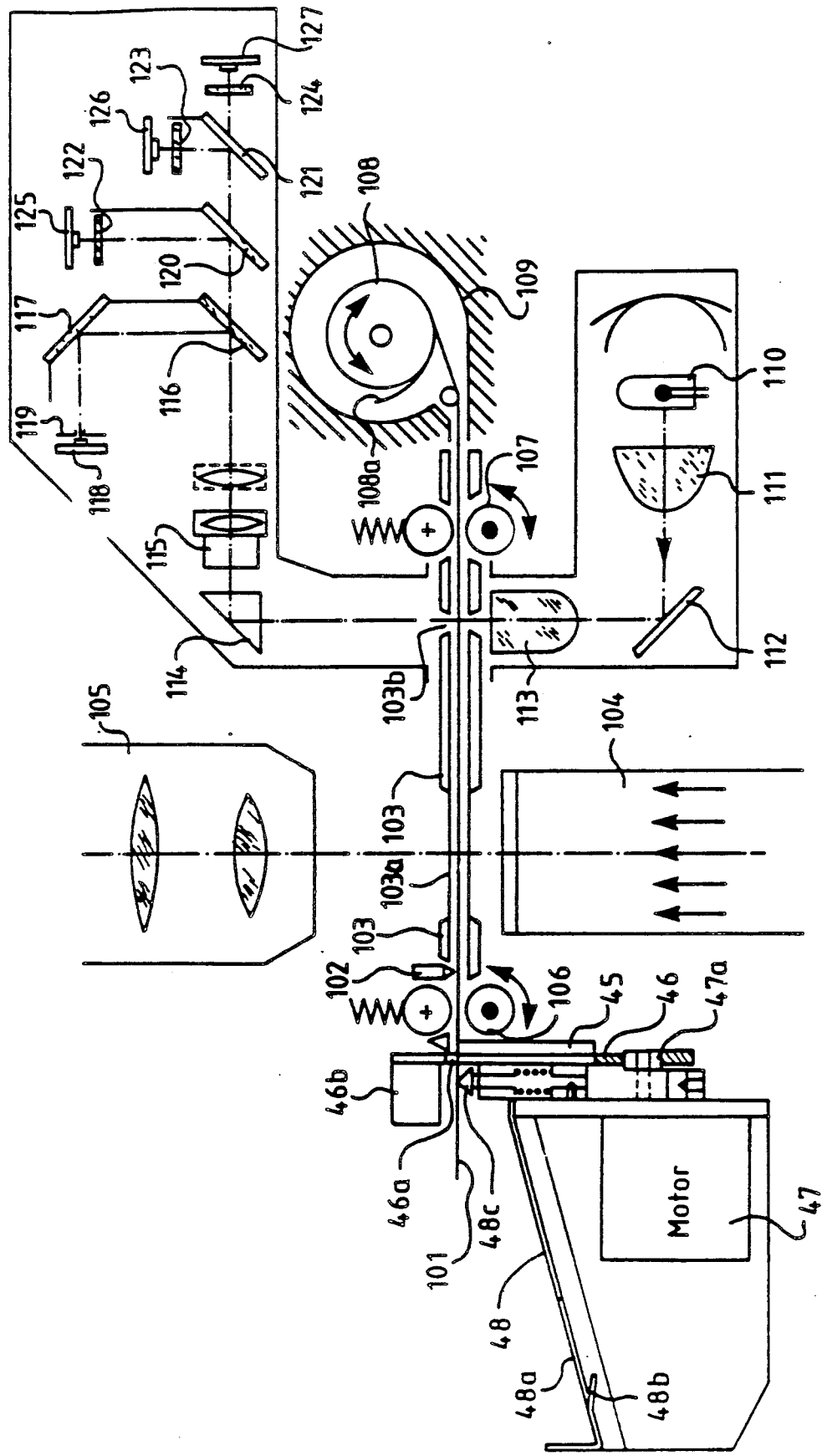
FIG. 2 is a schematic side view of another apparatus according to the invention in which a band of exposed and developed photosensitive material is analyzed while being wound into a storage device and is thereafter unwound for processing.

Referring to FIG. 2, the reference numeral 101 identifies a band in the form of a photographic film which is to be processed individually. This film contains images as well as perforations serving for film transport. The perforations are applied to at least one lateral margin of the film and represent steps of very high precision. As a rule, neighboring images are separated by an unexposed area having a density different from the densities of the images.

FIG. 2 further illustrates another embodiment of a processing apparatus according to the invention. The apparatus of FIG. 2 includes a guide 103 and the film 101 is inserted in the guide 103. A film sensor 102, e.g., a conventional pronged or reflex light barrier, is arranged at the entrance to the guide 103. The film sensor 102 functions to detect the ends of the film 101.

A copying window 103a is formed in the film guide 103 in register with a reflectorized lamp housing 104 for illuminating the images. An objective 105 is disposed above the copying window 103 and functions to project a copy of an image onto non-illustrated copy material.

Two pairs of transporting rollers serve to advance the film longitudinally along a predetermined path. A first pair of transporting rollers 106 is located upstream of the copying window 103a as considered in a direction from left to right in FIG. 2 while the second pair of transporting rollers 107 is situated downstream of the copying window 103a and a scanning slit 103b. The scanning slit 103b, which is provided in the film guide 103, is in register with the path of the film and extends perpendicular to such path. The transporting rollers 107 constitute the main drive for the film whereas the transporting rollers 106 constitute an auxiliary drive which function mainly to draw the film into and discharge the film from the guide 103. One or both pairs of transporting rollers 106,107 are accommodated in cutouts formed in the film guide 103.

A coiling chamber 109 having a reel 108 is located at the end of the film guide 103 remote from the film sensor 102. The reel 108 is provided with a holder 108a which engages the leading end of the film as it enters the coiling chamber 109.

The scanning slit 103b is illuminated by a lamp 110 provided with a reflector. Light from the lamp 110 passes through a condenser 111 to a reflector 112 which deflects the light to a cylindrical lens 113. The cylindrical lens 113 makes the light rays parallel and causes the slit 103b to be uniformly illuminated.

After traversing the path of the film, the light arrives at a prism 114 which directs the light to an objective 115. The objective 115 is interchangeable so as to permit adjustment to different film widths. From the objective 115, the light travels to a beam splitter 116 which reflects a portion of the light to a reflector 117. The reflector 117, in turn, deflects the light to a slotted diaphragm 119. Upon passing through the slotted diaphragm 119, the light arrives at a light sensor 118 in the form of a row of measuring cells, preferably photoelectric cells. The objective 115 produces a copy of the scanning slit 103b, or of the film segment in register with the slit 103b, on the light sensor 118. The length of the light sensor 118 is approximately equal to the width of an image. However, the light sensor 118 is provided with a light detector at a location or locations corresponding to the perforations in the film.

The portion of the light which passes through the beam splitter 116 travels to a dichroitic reflector 120, that is, a reflector which reflects light of one color and transmits the remaining light. The reflected light passes through a color filter 122 and then impinges upon a light sensor 125. The light sensor 125, which can be similar to the light sensor 118, is sensitized to one of the primary colors, namely, the color of the light arriving at the sensor 125.

The portion of the light transmitted by the dichroitic reflector 120 travels to a second dichroitic reflector 121 which reflects a portion of the incoming light to a color filter 123. After passing through the color filter 123, the light arrives at a light sensor 126 which can be similar to the light sensor 125 but is sensitized to a second one of the primary colors.

The portion of the light transmitted by the dichroitic reflector 121 travels through a color filter 124 and then impinges upon a light sensor 127. The light sensor 127, which can be similar to the light sensors 125 and 126, is sensitized to the third primary color.

The distances in the optical system associated with the scanning slit 103b are selected in such a manner that the objective 115 forms a sharp copy of the segment of the film in register with the scanning slit 103b on each of the light sensors 125,126,127.

A cutting device is disposed upstream of the transporting rollers 106 and the entrance to the guide 103 as considered from left to right in FIG. 2. The cutting device includes a knife 46 which is mounted on a guide 45 and is provided with a slot 46a in the area of the film guide 103. The upper boundary surface of the slot 46a serves as the cutting edge of the knife 46. The guide 45, in addition to its function as a guide, constitutes an abutment which cooperates with the cutting edge of the slot 46a during a cutting operation. The knife 46 is driven by a motor 47 which performs one revolution in response to a triggering pulse. The film passes through the slot 46a and, when the film is to be cut, the motor 47 moves the knife 46 downwards via an eccentric 47a by a distance sufficient for the knife 46 to sever the film. Subsequently, the motor 47 moves the knife 46 upwards to the illustrated starting position. Repetition of this sequence allows the film to be cut into strips.

The film travels from right to left in FIG. 2 during the severing operation. Downstream of the knife 46 as considered in the direction of travel of the film during severing is a tray 48 which receives the strips separated from the remainder of the film. The tray 48 has a cutout 48a which permits the stack of strips formed in the tray to be engaged from the front. The tray 48 further has an inclined guide ramp 48b serving to raise the margins of the film which have been shifted forwards above the cutout 48a.

A holding or confining device is disposed at each lateral margin of the film in the vicinity of the knife 46 and each of the holding devices includes a resiliently biased, mushroom-shaped holder 48c. The holders 48c project slightly inwards beyond the margins of the film approximately the same distance as the perforations. An abutment or urging element 46b is secured to the upper edge of the knife 46 and, upon downward movement of the knife 46, urges the severed strip downwards between the holders 48c.

Figure 3:
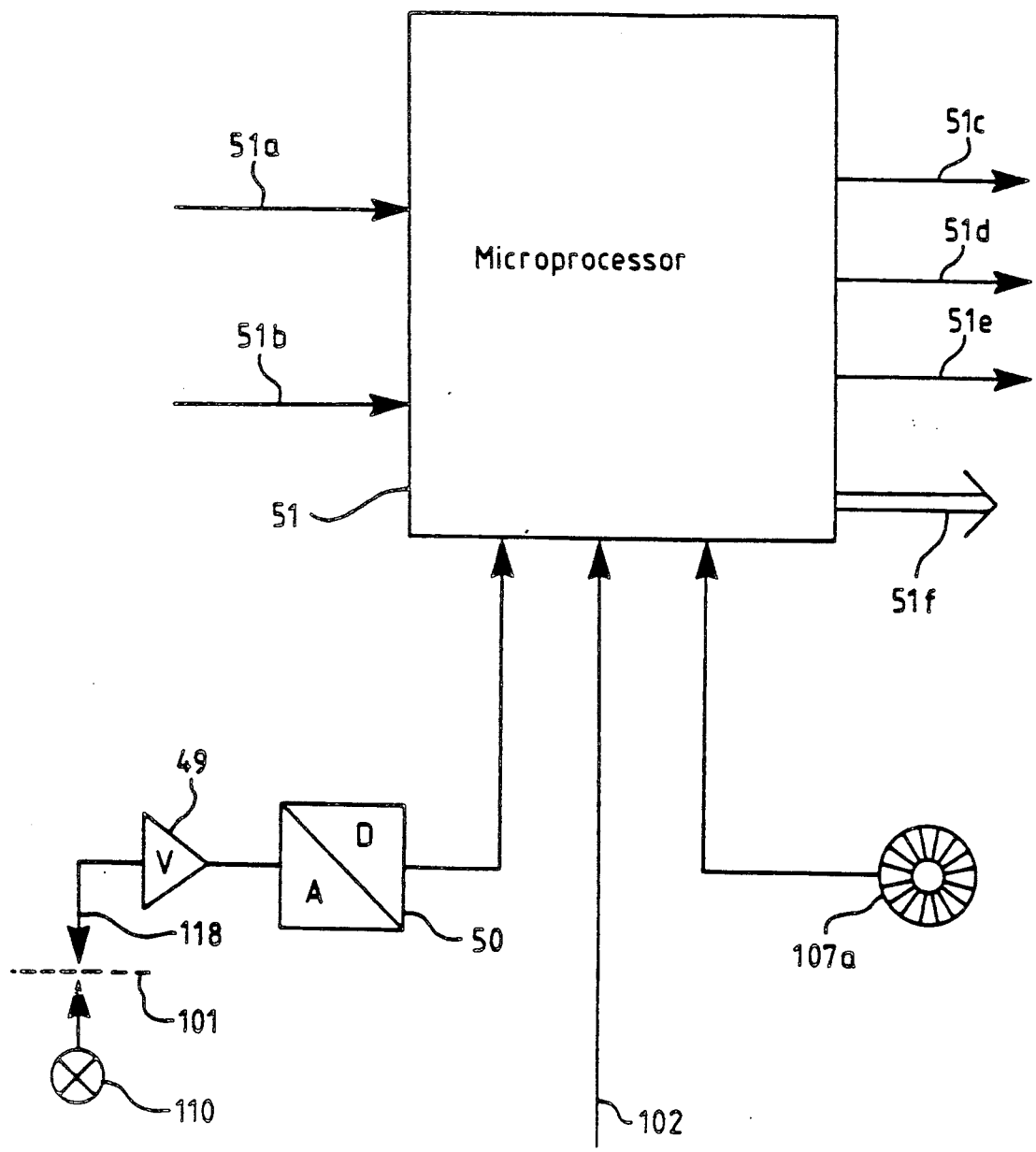
FIG. 3 diagrammatically illustrates the devices for controlling the apparatus of FIG. 2.

The control means for the apparatus of FIG. 2 is illustrated in FIG. 3. The lower left-hand portion of FIG. 3 shows the film 101 as well as the lamp 110 and the sensor 118 which are used in FIG. 2 to analyze the film 101. Other components shown in the lower left-hand portion of FIG. 3 and used in analysis of the film 101 are an amplifier 49 and an A/D converter 50 The A/D converter 50 sends digitized signals to a microprocessor 51 and these signals represent the measured densities of the segment of the film 101 in register with the scanning slit 103b of FIG. 2. In addition to the input for the A/D converter 50, the microprocessor 51 has an input for the film sensor 102 and an input for a length measuring device, that is, a device which measures the length of the film 101 passing by a predetermined location of the film path. The length measuring device may, for example, include a circular disc 107a which is mounted on the shaft of one of the transporting rollers 107, and a mechanism for measuring the angle of rotation of the disc 107a. If a step motor is employed in the apparatus of FIG. 2, length measurement can be accomplished by counting the pulses for the step motor.

The microprocessor 51 further has an input 51a for corrections in position at the knife 46 and an input 51b for corrections in position at the copying station. The microprocessor 51 is also provided with an output 51c to the transporting motor for the film, an output 51d to the motor 47 for the knife 46 and an output 51e which functions to initiate exposure once an image is held stationary. An output 51f provides communication with a central processing unit for calculation of the exposure parameters. The microprocessor 51 evaluates the density signals from the sensors which detect the unexposed areas between neighboring images, the distribution algorithm for the unexposed areas and the control program for film transport and knife activation.

In accordance with the teachings of the West German Patent Application No. P 38 33 732, the microprocessor 51 uses the measured density values to establish the positions of the images longitudinally of the film. Thus, the microprocessor 51 assigns a position coordinate to each detected image representing the position of the image longitudinally of the film. Based on the measured overall length of the film, the number of images in the film and the positions of the images, the microprocessor 51 then establishes the locations at which the film is to be cut. The cutting locations are selected in such a manner that none of the strips cut from the film are too long and none have a length smaller than a predetermined minimum length or a number of images less than a predetermined minimum number. This includes the strips which contain the ends of the film.

The operation of the apparatus of FIG. 2, which includes the control means of FIG. 3, is as follows:

The leading end of the film 101, as considered from left to right in FIG. 2, is manually introduced into the film guide 103 from the left. The film sensor 102 activates the auxiliary film transporting rollers 106 which continuously feed the leading end of the film to the main transporting rollers 107 via the copying window 103a and the scanning slit 103b. The main transporting rollers 107 then take over transport of the film while the auxiliary transporting rollers 106 are made inoperative, e.g., by moving the auxiliary transporting roller 106 which functions as a pressure roller out of contact with the film. The main transporting rollers 107 now advance the leading end of the film into the coiling chamber 109 where, due to the design of the latter, the leading end of the film is brought into engagement and held by the holder 108a of the reel 108. The reel 108 has its own drive which is designed so that the distance traveled and the speed of advance are determined by the drive including the main transporting rollers 107.

When the leading end of the film passes by the scanning slit 103b, the scanning procedure begins. The portion of the light transmitted by the beam splitter 116 is used by the three light sensors 125,126,127 to analyze the images region-by-region for the three primary colors. At least one hundred measurements per image are obtained for each primary color and these measurements are processed e.g., according to the teachings of the West German Patent No. 28 40 287, to determine the color composition of the copy light and the exposure time which will yield optimally filtered copies. The light coming from the images and reflected by the beam splitter 116 is continuously checked for marked density changes by the light sensor 118. The latter generates signals in response to the detection of marked density changes and, after appropriate amplification by the amplifier 49, these signals are converted into pulses if necessary and sent to the microprocessor 51.

By means of a counter constituting part of the length measuring device which includes the disc 107a, the longitudinal coordinate of the respective region being scanned, i.e., the position of the region longitudinally of the film, is fed into the microprocessor 51 together with the measurements obtained from such region during scanning. The microprocessor 51 is provided with a register which stores such data in a suitable form.

The entire film is scanned in the manner described. Of the density jumps detected in the images, at least those having a predetermined minimum magnitude are stored in the register.

The film is continuously scanned at the scanning slit 103b as it is coiled into the coiling chamber 109. When the film has been wound to such an extent in the coiling chamber 109 that the trailing end of the film, as considered from left to right in FIG. 2, reaches the film sensor 102, film transport is terminated once the film has been transported an additional distance sufficient to convey the remainder of the film by the scanning slit 103b. Subsequently, the drive motor for the film and the counter for the steps advanced by the film are reversed.

Before or during withdrawal of the film from the coiling chamber 109, the precise positions of the images are calculated and paired with the respective longitudinal coordinates established by the counter. The calculated positions are used to position the images in the copying window 103a. The microprocessor 51, however, has also determined the locations at which the film is to be cut. Upon arrival of such a location at the slot 46a of the knife 46, film transport is stopped and a cutting procedure is performed by activating the motor 47 for the knife 46. Due to the downward movement of the abutment 46b, the end of the severed strip is pressed down below the mushroom-shaped holders 48c so that, even if the film has a strong tendency to curl, an orderly stack of strips is obtained Following the cutting procedure, film transport is continued in order to position the next image or negative, i.e., the image or negative immediately upstream of the copying station, in the copying window The distance between a transverse edge of the copying window and the cutting edge of the knife 46 can be chosen so that it is exactly equal to the average distance between two neighboring images. Under certain circumstances, this makes it possible to save the time which is required to stop the film for a cutting procedure and again accelerate the film. Once the copying procedures and associated movements for an appropriate number of images have been completed, the next cutting location arrives at the cutting device and the next cutting procedure is initiated.

When the last strip, i.e., the strip which contains the trailing end of the film as considered in the direction of transport during copying and cutting, has passed through the cutting device, a final cutting procedure is initiated. Although no cut is made, this has the purpose of urging the last strip into the holding devices.

The control means described can be used with advantage when, in addition to the cutting device, the apparatus is provided with a packing device for the strips. By way of example, the apparatus could be designed to insert the strips in leporello-like folding pouches or, alternatively, to confine the strips between two plastic foils by thermal bonding and to then cut the strips.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

We claim:

1. Apparatus for processing a band of exposed and developed photosensitive material, particularly photographic film, carrying a multiplicity of images each of which has a pair of transverse edges spaced longitudinally of the band, comprising means for conveying the band longitudinally along a predetermined path; means at a predetermined location of said path for measuring the length of the band travelling by said predetermined location and means for detecting the transverse edges of said images; means at another location of said path for processing the band, said processing means comprising means for copying the images and means for dividing the band into strips; and means for regulating at least one of said conveying means and said processing means, said regulating means including a computer for receiving data from said measuring means and said detecting means, analyzing said data for all images of the band and thereafter transmitting control pulses to said dividing means so that the latter divides the band into strips such that each strip has a length smaller than a predetermined maximum length and a minimum length corresponding to a number of images greater than a predetermined minimum number.

2. The apparatus of claim 1, wherein said regulating means is programmed to assign a coordinate to each detected transverse edge representing the position of the respective transverse edge longitudinally of the band.

3. The apparatus of claim 2, wherein said regulating means comprises a memory and is designed to store the position coordinates in said memory.

4. The apparatus of claim 1, wherein said detecting means comprises a photoelectric sensor.

5. The apparatus of claim 1, wherein said detecting means comprises a member having a slit in register with said path and extending transversely thereof, and a source of illumination for said slit.

6. The apparatus of claim 1, wherein said processing means further comprises means for marking the band for division into strips.

7. The apparatus of claim 6, wherein said processing means further comprises means for forming markings on the band in predetermined positions relative to the images, said marking means and said forming means being located on opposite sides of said path across from one another.

8. The apparatus of claim 1, wherein said processing means comprises means for dividing the band into strips when said conveying means transports the band through said processing means in a predetermined direction; and further comprising means for confining the strips upon division, means responsive to said dividing means for urging the strips into said confining means, and means for receiving the strips, said confining means, urging means and receiving means being disposed downstream of said dividing means as considered in said predetermined direction.

9. A method of processing a band of exposed and developed photosensitive material, particularly photographic film, carrying a multiplicity of images each of which has a pair of transverse edges spaced longitudinally of the band, comprising the steps of conveying the band longitudinally along a predetermined path; measuring the length of the band travelling by a predetermined location of said path and generating data denoting the measured length; establishing the positions of images on the band and detecting the transverse edges of the images, including generating data denoting the locations of detected transverse edges; processing the band at a processing location of said path, comprising copying the images and dividing the band into strips; and regulating at least one of said conveying and processing steps, including transmitting said data to a computer for an analysis of such data for all images of the band and for subsequent transmission of control pulses for the carrying out of said dividing step so that the band is divided into strips such that each strip has a length smaller than a predetermined maximum length and a minimum length corresponding to a number of images greater than a predetermined minimum number.

10. The method of claim 9, wherein the establishing step further comprises assigning a position coordinate to each detected transverse edge representing the position of the respective transverse edge longitudinally of the band, said assigning being performed using the data denoting said measured length.

11. The method of claim 10, further comprising the step of storing said position coordinates.

12. The method of claim 9, wherein said detecting is performed photoelectrically.

13. The method of claim 9, wherein said detecting comprises successively scanning strip-shaped portions of said band extending transversely thereof.

14. The method of claim 9, wherein said band has an end and one of said strips includes said end, the processing step being performed such that said one strip has at least said predetermined minimum length or at least said predetermined minimum number of images.

15. The method of claim 9, wherein the establishing step comprises detecting at least one transverse edge of each selected image at a preselected location of said path disposed downstream of said processing location as considered in a first direction, the band being conveyed by said preselected location in said first direction during said detecting, and the band subsequently being conveyed by said preselected location in a second direction counter to said first direction, the the processing step being performed during travel of the band in said second direction.

* * * * *

UNITED STATES PATENT AND TRADEMARK OFFICE
CERTIFICATE OF CORRECTION

PATENT NO. : 5,126,785

DATED : June 30, 1992

INVENTOR(S) : Erich NAGEL et al

It is certified that error appears in the above-identified patent and that said Letters Patent is hereby corrected as shown below:

On the Title page, item [75] Inventors: "Nagel Erich" should read --Erich Nagel--.

In the Abstract: Line 19, "to" should read --too--.

Col. 6, line 23, "10" should be deleted.

Signed and Sealed this

Twenty-first Day of September, 1993

Attest:

BRUCE LEHMAN

*Attesting Officer*         *Commissioner of Patents and Trademarks*